UNITED STATES PATENT OFFICE.

ALEXANDER S. RAMAGE, OF BUFFALO, NEW YORK, ASSIGNOR TO THE CHEMICAL DEVELOPMENT CO., OF BUFFALO, NEW YORK, A CORPORATION OF COLORADO.

METHOD OF MAKING PAINTS.

1,004,078. Specification of Letters Patent. Patented Sept. 26, 1911.

No Drawing. Application filed August 22, 1910. Serial No. 578,469.

*To all whom it may concern:*

Be it known that I, ALEXANDER S. RAMAGE, a citizen of the United States, residing at Buffalo, in the county of Erie and State of New York, have invented certain new and useful Improvements in Methods of Making Paints, of which the following is a specification.

This invention relates to the preparation of paints, printing inks and like compositions, the object of the invention being the provision of a method wherein the expensive steps of washing and drying the pigment and grinding the same in oil are either completely eliminated or so modified as greatly to reduce the time and cost of the operation.

The present method is applicable to all pigments without exception, whether freshly precipitated or dry, and to a wide variety of vehicles; and the product is superior in quality to paints as heretofore prepared.

The method will be described by reference to certain specific embodiments thereof, it being understood that the invention is not thereby limited.

According to the preferred mode of practicing the invention the pigment, suspended in or mixed with water, is intimately mixed with a suitable soap, usually a stearate or oleate soap or a mixture of these, the soap being previously dissolved. A suitable proportion of soap is approximately thirty per cent. by weight of the amount of pigment taken, although more or less than this proportion may be used with satisfactory results. The mixture may be moderately heated, boiling temperatures being avoided. In case of certain pigments, as the basic lead salts, including red lead, a reaction occurs whereby lead soaps are formed, whereas with other pigments no such reaction occurs at this stage of the process, or only to a negligible extent. In all cases any excess of soap in solution is precipitated as an insoluble metallic soap by adding a solution of a metallic salt, usually but not necessarily a salt of the metal of the pigment, the mixture being well stirred. The precipitate is curdy in character and subsides quickly. The liquor is decanted and the precipitate or curd thrown onto a screen or filter which may be of cheesecloth. It is rapidly washed on the screen, usually with a hose, and the curd is then pressed to expel the excess of water, and transferred to a steam-jacketed kettle, preferably provided with stirring arms, an ordinary soap-boiler's kettle being suitable. In the kettle the curd is melted and stirred until the water is eliminated, as indicated by a state of quiet fusion. There is then added directly to the melted mass such proportion of linseed oil or other appropriate vehicle that the mixture when cooled remains as a thin paste. This paste can be further thinned with oil or turpentine or with rosin varnish and is ready for use as a paint.

For the preparation of a paint from Prussian blue, for example, the procedure may be as follows: To a solution of ferrocyanid of sodium or potassium is added a stearate or oleate soap in the proportion of 30% by weight of the precipitate of iron ferrocyanid, and the mixture is added to an equivalent amount of ferrous sulfate. To the resulting mixture is added with stirring an excess of a ferric salt, as the sulfate or chlorid, serving to precipitate the soap and also to oxidize the precipitated iron salt. The resulting precipitate consisting of a ferric soap and Prussian blue is curdy in character provided the temperature has not exceeded 100° C., and is filtered off and washed in the filter, pressed, heated to quiet fusion and mixed with oil precisely as above described. The resulting paste may if desired be thinned with lithographic varnish for production of a printing ink, no milling being required or effective to secure a finer subdivision of the pigment than is obtainable by the simple procedure above described.

In the preparation of printing inks it is desirable to add linseed oil soap to the stearate or oleate soap. In practice it is preferred to use equal proportions of linseed and oleate soaps, precipitating the excess soap with a lead salt.

For the production of yellow chromes, bichromate of potassium or sodium in solution is nearly neutralized by sodium carbonate, and the required proportion of stearate or oleate soap is added; preferably about thirty per cent. by weight of the yellow chrome formed. This solution is then run into a lead acetate solution with constant stirring, the amount of lead acetate being sufficient to precipitate the entire quantity of soap. The resulting curdy precipitate is treated as above described.

By a combination of the two methods above described any desired shade of green may be obtained.

In the preparation of paints from pigments which are affected by traces of alkali, as for example Prussian blue, yellow chromes or greens containing these pigments, it is necessary to observe special precautions in the preparation of the soap to avoid the presence therein of free alkali. Somewhat less caustic soda than is required for complete saponification should be used, so that the soap will contain a slight excess of fat, and common salt alone should be used for salting out. When these soaps are dissolved, the solution is allowed to stand until cold when the excess fat may be skimmed off. Soaps thus prepared do not affect the color of the pigment, whereas with soaps containing free alkali it is not practicable to use Prussian blue, and chrome yellows show the orange color of the basic chrome.

In case it is desired to use insoluble pigments such as the oxids of iron, zinc, etc., the oxid is mixed with water and with thirty per cent. or more of its weight of stearate or oleate soap or a mixture of these. The soap is then thrown down by addition of a metallic salt, preferably a salt of the metal of the pigment used, as ferric salts with iron oxid pigments, etc. However, lead acetate may be used for precipitation of part or all of the soap, where light colors or a quick drying paint is desired.

In the case of red and white lead, these are heated with a soap solution in the proportion of one-fourth to one-half or more of soap by weight of the pigment, and the excess of soap is precipitated by a suitable salt, as lead acetate or alum. In the case of zinc oxid or lithopone the same procedure is followed, zinc sulfate being preferably used as the precipitant.

In the case of Venetian reds, ochers, umbers, siennas and other pigments containing calcium compounds, the soap, preferably an oleate soap, is added in proper proportion, usually about 50% by weight of the pigment, and is precipitated by the calcium salts. In such cases it is usually unnecessary to use an extraneous precipitant. The subsequent procedure is as in the foregoing cases.

The paints prepared as above described yield films which are water-repellent, and are capable of enduring prolonged exposure to weather conditions without becoming chalky or absorbent or showing other evidences of deterioration. They may be thinned with turpentine, naphtha or even rosin varnishes for the preparation of ready mixed paints, and do not settle into hard masses or cake on standing.

The curdy precipitate consisting essentially of the pigment and an insoluble metallic soap formed in presence of the pigment and intimately associated therewith is water-repellent and may be washed with the utmost ease; and, as above pointed out, it may be simply melted and mixed with oil instead of being subjected to prolonged grinding therewith in a dry or wet state as in previous processes. By reason of the elimination of the slow processes of washing, drying and grinding the pigments, and mixing and grinding the same with oil, the present method is highly economical and rapid as compared with the processes as heretofore practiced.

I claim:

1. The method of making paints and like compositions, which consists in compounding a suitable paint vehicle with a pigment and an insoluble metallic soap while said soap is rendered fluid by the aid of heat.

2. The method of making paints and like compositions, which consists in precipitating a metallic soap in presence of a pigment, drying and melting the mixture, and compounding therewith a suitable paint vehicle.

3. The method of making paints and like compositions, which consists in simultaneously precipitating a pigment and an insoluble metallic soap, drying and melting the product, and compounding therewith a suitable paint vehicle.

In testimony whereof, I affix my signature in presence of two witnesses.

ALEXANDER S. RAMAGE.

Witnesses:
C. P. TOWNSEND,
E. A. BYRNES.